US012277894B2

(12) United States Patent
Lee

(10) Patent No.: US 12,277,894 B2
(45) Date of Patent: Apr. 15, 2025

(54) GATE DRIVING CIRCUIT AND ELECTROLUMINESCENCE DISPLAY DEVICE USING THE SAME

(71) Applicant: LG DISPLAY CO., LTD., Seoul (KR)

(72) Inventor: Sung Jin Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/979,516

(22) Filed: Nov. 2, 2022

(65) Prior Publication Data

US 2023/0206825 A1 Jun. 29, 2023

(30) Foreign Application Priority Data

Dec. 27, 2021 (KR) ........................ 10-2021-0188335

(51) Int. Cl.
*G09G 3/32* (2016.01)
*G09G 3/3225* (2016.01)
(Continued)

(52) U.S. Cl.
CPC ............. *G09G 3/32* (2013.01); *G09G 3/3225* (2013.01); *G09G 3/3233* (2013.01);
(Continued)

(58) Field of Classification Search
CPC .......... G09G 3/30; G09G 3/32; G09G 3/3208; G09G 3/3225; G09G 3/3233; G09G 3/3266; G09G 3/3275; G09G 2300/0404; G09G 2300/0426; G09G 2300/0814; G09G 2300/0819; G09G 2300/0842;
(Continued)

(56) References Cited

U.S. PATENT DOCUMENTS

| | | | |
|---|---|---|---|
| 10,991,302 | B1 | 4/2021 | Park et al. |
| 2015/0015554 | A1 | 1/2015 | Kim |

(Continued)

FOREIGN PATENT DOCUMENTS

| | | | |
|---|---|---|---|
| JP | 2020-187186 A | 11/2020 | |
| KR | 10-0931472 B1 | 12/2009 | |

(Continued)

OTHER PUBLICATIONS

English Language Translation of KR-20190012448-A (Year: 2019).*

(Continued)

*Primary Examiner* — Jason M Mandeville
(74) *Attorney, Agent, or Firm* — Morgan, Lewis & Bockius LLP

(57) ABSTRACT

A gate driving circuit includes: a first pull-down circuit controlled by a Q node to transmit a low voltage to a first output node; a first pull-up circuit controlled by a QB1 node to transmit a high voltage to the first output node; a QB2 node control circuit to transmit a voltage of the QB1 node to the QB2 node; a second pull-down circuit controlled by the Q node to transmit a low voltage to a second output node; and a second pull-up circuit controlled by the QB2 node to transmit a high voltage output clock signal to the second output node. A pulse width of a signal output to the first output node is the same as a pulse width of the Q node. A pulse width of a signal output to the second output node is the same as a pulse width of the output clock signal.

18 Claims, 5 Drawing Sheets

(51) Int. Cl.
*G09G 3/3233* (2016.01)
*G09G 3/3266* (2016.01)
*G09G 3/3275* (2016.01)

(52) U.S. Cl.
CPC ......... *G09G 3/3266* (2013.01); *G09G 3/3275* (2013.01); *G09G 2300/0426* (2013.01); *G09G 2300/0814* (2013.01); *G09G 2300/0819* (2013.01); *G09G 2300/0842* (2013.01); *G09G 2300/0852* (2013.01); *G09G 2300/0866* (2013.01); *G09G 2310/0267* (2013.01); *G09G 2320/045* (2013.01); *G09G 2330/021* (2013.01)

(58) Field of Classification Search
CPC ....... G09G 2300/0866; G09G 2310/02; G09G 2310/0243; G09G 2310/0262; G09G 2310/0264; G09G 2310/0267; G09G 2310/0286; G09G 2330/021; G09G 2300/0852; G09G 2320/045
USPC ...................................................... 345/55, 76
See application file for complete search history.

(56) References Cited

U.S. PATENT DOCUMENTS

| | | | | |
|---|---|---|---|---|
| 2015/0138180 A1 | | 5/2015 | Park et al. | |
| 2017/0162101 A1 | | 6/2017 | Ohara et al. | |
| 2019/0035322 A1 | * | 1/2019 | Kim | H01L 27/1225 |
| 2021/0166597 A1 | | 6/2021 | Feng et al. | |
| 2023/0107775 A1 | * | 4/2023 | Kim | H03K 17/6871 345/83 |

FOREIGN PATENT DOCUMENTS

| | | | | | |
|---|---|---|---|---|---|
| KR | 20190012448 A | * | 2/2019 | | G09G 3/3266 |
| KR | 10-2019-0136816 A | | 12/2019 | | |
| KR | 10-2020-0081071 A | | 7/2020 | | |
| KR | 10-2270613 B1 | | 6/2021 | | |
| KR | 10-2021-0082904 A | | 7/2021 | | |
| WO | 2015/093100 A1 | | 6/2015 | | |
| WO | 2020/168798 A1 | | 8/2020 | | |

OTHER PUBLICATIONS

English Language Translation of KR-20190012448-A with Page and Line Numbers (Year: 2019).*
Office Action issued Aug. 22, 2023 for counterpart Japanese Patent Application No. 2022-134573 (See English Translation).
Office Action dated Jan. 9, 2025, issued in corresponding Korean Patent Application No. 10-2021-0188335.

* cited by examiner

GATE DRIVING CIRCUIT AND ELECTROLUMINESCENCE DISPLAY DEVICE USING THE SAME

CROSS-REFERENCE TO RELATED APPLICATION

This application claims priority to and the benefit of Korean Patent Application No. 2021-0188335, filed on Dec. 27, 2021, the disclosure of which is incorporated herein by reference in its entirety.

BACKGROUND

1. Technical Field

The present specification relates to a gate driving circuit with low power consumption and improved image quality and an electroluminescence display device using the same.

2. Discussion of the Related Art

As information technology develops, the market for a display device, which is a connection medium between users and information, grows. Accordingly, the use of various types of display devices such as an electroluminescent display device, a liquid crystal display device, an organic light emitting display device, and a quantum dot display device is increasing.

Among the display devices, the electroluminescent display device has advantages of a quick response time, high luminous efficiency, and a wide viewing angle. Generally, the electroluminescent display device applies a data voltage to a gate electrode of a driving transistor using a transistor turned on by a scan signal, and charges the data voltage supplied to the driving transistor in a storage capacitor. Further, a light emitting element emits light by outputting the data voltage charged in the storage capacitor using an emission control signal. The light emitting element may include an organic light emitting element, an inorganic light emitting element, and a quantum dot element.

In order for the light emitting element to emit light with an accurate color and luminance, a pixel circuit including a driving transistor and a capacitor has been variously developed, and transistors using an oxide have been recently used to reduce power consumption.

The electroluminescent display device includes a gate driving circuit and a data driving circuit for supplying a gate signal and a data signal to such a pixel circuit, respectively. Among the circuits, the gate driving circuit may provide at least one emission signal and scan signal. Generally, the gate driving circuit, which generates the scan signal, may include a shift register for sequentially outputting the gate signal.

The gate driving circuit is sometimes implemented in the form of a gate-in-panel (GIP) formed by a combination of transistors in a bezel region, which is a non-display region of a display panel. For the gate driving circuit, methods for simplifying driving for a low power consumption effect, securing a narrow bezel region, and improving image quality are being sought to be suitable for the changing characteristics of a pixel circuit.

SUMMARY

Accordingly, embodiments of the present disclosure are directed to a gate driving circuit and an electroluminescence display device using the same that substantially obviate one or more of the problems due to limitations and disadvantages of the related art.

An aspect of the present specification is to provide a gate driving circuit configured to output a gate signal to be provided to an oxide transistor included in a pixel circuit, and an electroluminescence display device using the same.

Another aspect of the present specification is to provide a gate driving circuit in which a non-display region of a display panel is reduced and power consumption is reduced by integrating a scan driving circuit configured to output two or more scan signals and simplifying driving of the scan driving circuit configured to output two or more scan signals, and an electroluminescence display device using the same.

Another aspect of the present specification is to provide a gate driving circuit capable of maintaining a stable output even when driven at a low speed frequency, and an electroluminescence display device using the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a gate driving circuit comprises: a first pull-down circuit controlled by a Q node and configured to transmit a low voltage to a first output node; a first pull-up circuit controlled by a QB1 node and configured to transmit a high voltage to the first output node; a QB2 node control circuit configured to transmit a voltage of the QB1 node to a QB2 node; a second pull-down circuit controlled by the Q node and configured to transmit a low voltage to a second output node; and a second pull-up circuit controlled by the QB2 node and configured to transmit a high voltage of a first output clock signal to the second output node. A pulse width of a signal output to the first output node is the same as a pulse width of the Q node, and a pulse width of a signal output to the second output node is the same as a pulse width of the first output clock signal. Accordingly, it is possible to secure the reliability of the gate driving circuit and reduce a bezel of an electroluminescent display device.

In another aspect, an electroluminescence display device comprises a display panel classified into a display region including a plurality of pixel lines including a plurality of pixels and a non-display region including a gate driving circuit providing a gate signal to the plurality of pixel lines, wherein each of the plurality of pixels includes a pixel circuit and a light emitting element, the pixel circuit includes a plurality of n-type transistors, and the gate driving circuit includes a p-type transistor. The pixel circuit includes: a first transistor turned on in an initialization period; a second transistor turned on in a sampling and programming period; and a third transistor and a fourth transistor turned on in an emission period. The gate driving circuit provides a first scan signal for turning on the first transistor and a second scan signal for turning on the second transistor, and the first scan signal and the second scan signal use a first output signal output from a previous pixel line as a start signal, and are output by a start clock signal synchronized with the first scan signal and a first output clock signal synchronized with the second scan signal. Accordingly, it is possible to secure the reliability of the gate driving circuit and reduce a bezel of an electroluminescent display device.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain various principles. In the drawings.

DETAILED DESCRIPTION

Figure 1:
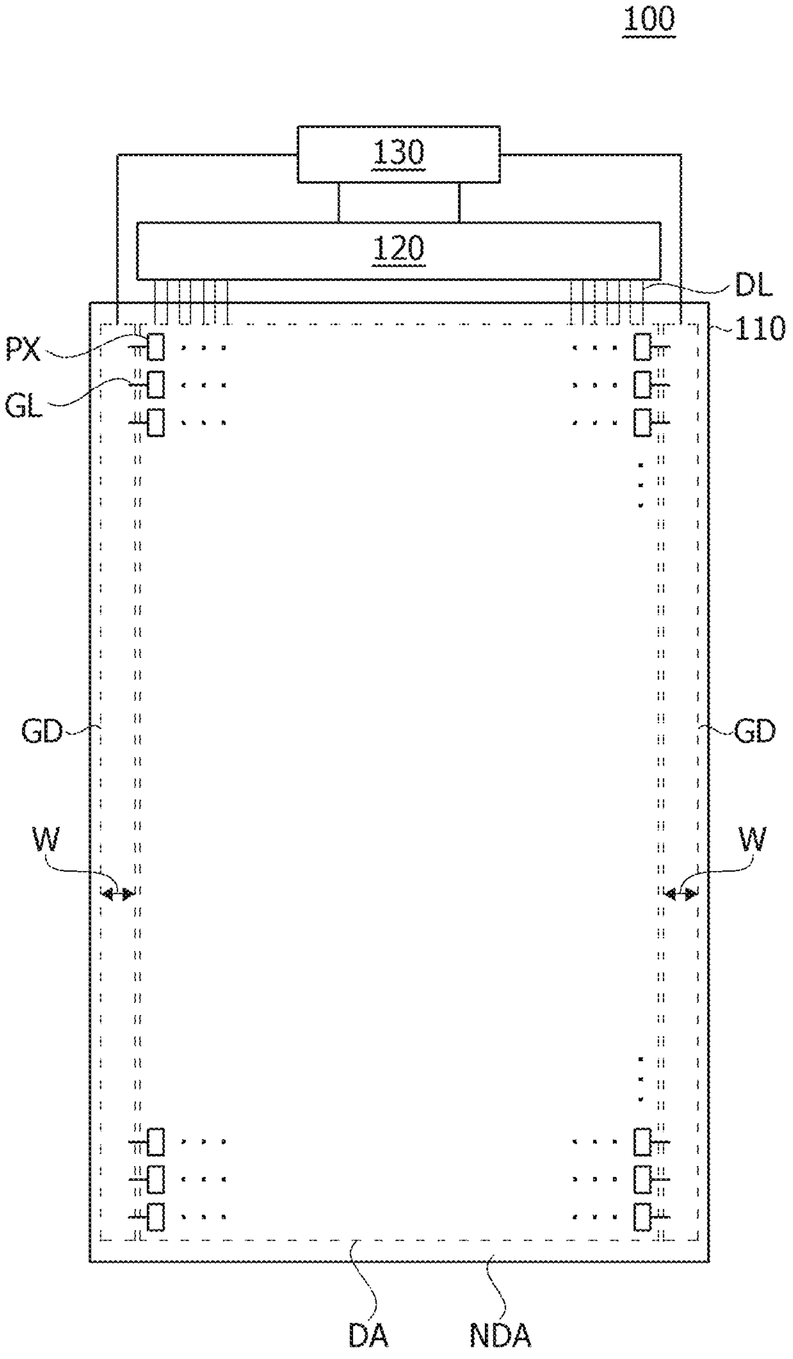
FIG. 1 is a block diagram of an electroluminescence display device according to one embodiment of the present specification.

Advantages and features of the present disclosure, and a method of achieving them, will become apparent with reference to preferable embodiments which are described in detail in conjunction with the accompanying drawings. However, the present disclosure is not limited to the embodiments to be described below and may be implemented in different forms, the embodiments are only provided to completely disclose the present disclosure and completely convey the scope of the present disclosure to those skilled in the art, and the present disclosure is defined by the disclosed claims.

Since the shapes, sizes, proportions, angles, numbers, and the like disclosed in the drawings for describing the embodiments of the present disclosure are only exemplary, the present disclosure is not limited to the illustrated items. The same reference numerals indicate the same components throughout the specification. Further, in describing the present disclosure, when it is determined that a detailed description of a related known technology may unnecessarily obscure the principle of the present disclosure, the detailed description thereof will be omitted. When 'including', 'having', 'consisting', and the like mentioned in this present specification are used, other parts may be added unless 'only' is used. A case in which a component is expressed in a singular form includes a plural form unless otherwise explicitly stated.

In interpreting the components, it is understood that an error range is included even when there is no separate explicit description.

In the case of a description of a positional relationship, for example, when the positional relationship of two parts is described as 'on', 'at an upper portion', 'at a lower portion', 'next to, and the like, one or more other parts may be located between the two parts unless 'immediately' or 'directly' is used.

In the case of a description of a temporal relationship, for example, when a temporal relationship is described as 'after', 'following', 'after', 'before', or the like, cases which are not continuous may be included unless 'immediately' or 'directly' is used.

Features of the various embodiments of the present specification may be partially or wholly coupled or combined with each other, technically various interlocking and driving are possible, and the embodiments may be implemented independent of each other or may be implemented together in a related relationship.

In the present specification, a gate driving circuit formed on a substrate of a display panel may be implemented as an n-type or p-type transistor. For example, the transistor may be implemented as a transistor having a metal oxide semiconductor field effect transistor (MOSFET) structure. The transistor is a three-electrode element including a gate electrode, a source electrode, and a drain electrode. The source electrode supplies carriers to the transistor. In the transistor, the carriers begin to move from the source electrode. The drain electrode is an electrode through which the carriers exit the transistor. The source electrode and the drain electrode of the transistor are not fixed, and the source electrode and the drain electrode of the transistor may be changed according to an applied voltage. The transistor described herein may include a thin film transistor (TFT).

Hereinafter, a gate driving circuit according to an embodiment of the present specification and an electroluminescence display device using the same will be described with reference to the accompanying drawings.

FIG. 1 is a block diagram of an electroluminescence display device 100 according to one embodiment of the present specification.

Referring to FIG. 1, the electroluminescence display device 100 according to one embodiment of the present specification may include a display panel 110 in which a plurality of data lines DL and a plurality of gate lines GL are disposed, and a plurality of sub-pixels PX connected to the plurality of data lines DL and the plurality of gate lines GL are arranged, and a driving circuit providing driving signals to the display panel 110.

The drawing illustrates that the sub-pixels PX are arranged in a matrix form and constitute a pixel array, but the present disclosure is not limited thereto, and the sub-pixels PX may be arranged in various forms.

The driving circuit may include a data driving circuit 120 providing data signals to the plurality of data lines DL, gate driving circuits GD providing gate signals to the plurality of gate lines GL, and a controller 130 which controls the data driving circuit 120 and the gate driving circuits GD.

The display panel 110 may include a display region DA where an image is displayed and a non-display region NDA which is a peripheral region of the display region DA. The plurality of sub-pixels PX may be disposed in the display region DA. The data lines DL providing the data signals and the gate lines GL providing the gate signals may be disposed in the plurality of sub-pixels PX.

The plurality of data lines DL disposed in the display region DA may extend to the non-display region NDA and may be electrically connected to the data driving circuit 120. The data lines DL electrically connect the sub-pixel PX and the data driving circuit 120, and may be implemented as a single line, or may connect a plurality of lines through a contact hole using a link line.

The plurality of gate lines GL disposed in the display region DA may extend to the non-display region NDA and may be electrically connected to the gate driving circuits GD. The gate lines GL electrically connect the sub-pixels PX and the gate driving circuits GD. In addition, gate driving-related lines necessary for the gate driving circuits GD to generate or drive gate signals may be disposed in the non-display region DA. For example, the gate driving-related lines may include one or more high voltage lines which supply a high level voltage to the gate driving circuits GD, one or more low voltage lines which supply a low level gate voltage to the gate driving circuits GD, a plurality of clock lines which supply a plurality of clock signals to the gate driving circuits GD, and a start line which supplies a start signal to the gate driving circuits GD.

In the display panel 110, the plurality of data lines DL and the plurality of gate lines GL are disposed in the sub-pixels PX. For example, the plurality of data lines DL and the plurality of gate lines GL may be disposed in rows or columns, respectively, and for convenience of description, it is assumed that the plurality of data lines DL are disposed in columns, and the plurality of gate lines (GL) are disposed in rows.

The controller 130 starts scanning according to a timing implemented in each frame, converts input image data input from the outside to match a data signal format used by the data driving circuit 120 to output the converted image data, and controls the data driving at an appropriate time according to the scanning.

The controller 130 receives timing signals including a vertical synchronization signal, a horizontal synchronization signal, an input data enable signal, a clock signal, and the like together with the input image data from the outside. The controller 130 receiving the timing signals generates and outputs the control signals for controlling the data driving circuit 120 and the gate driving circuits GD.

For example, the controller 130 outputs various data control signals including a source start pulse, a source sampling clock, a source output enable signal, and the like to control the data driving circuit 120. The source start pulse controls the data sampling start timing of one or more data signal generation circuits constituting the data driving circuit 120. The source sampling clock is a clock signal which controls the sampling timing of data in each of the data signal generation circuits. The source output enable signal controls the output timing of the data driving circuit 120.

Further, the controller 130 outputs a gate control signal including a gate start pulse, a gate shift clock, a gate output enable signal, and the like to control the gate driving circuits GD. The gate start pulse controls the operation start timing of one or more gate signal generation circuits constituting the gate driving circuit GD. The gate shift clock is a clock signal commonly input to the one or more gate signal generation circuits and controls the shift timing of the scan signal. The gate output enable signal designates timing information of the one or more gate signal generation circuits.

The controller 130 may be a timing controller used in conventional display device technology or a control device capable of further performing other control functions than the timing control.

The controller 130 may be implemented as a separate component from the data driving circuit 120, or may be integrated with the data driving circuit 120 and implemented as one integrated circuit.

The data driving circuit 120 may be implemented by including the one or more data signal generation circuits. The data signal generation circuit may include a shift register, a latch circuit, a digital-to-analog converter, an output buffer, and the like. The data signal generation circuit may further include an analog-to-digital converter in some cases.

The data signal generation circuit may be connected to a bonding pad of the display panel 110 by a tape automated bonding (TAB) method, a chip on glass (COG) method, or a chip on panel (COP) method, may be directly disposed on the display panel 110, or may be integrated and disposed on the display panel 110. In addition, the plurality of data signal generation circuits may be implemented by a chip on film (COF) method of mounting on a source-circuit film connected to the display panel 110.

The gate driving circuits GD sequentially supply the scan signals to the plurality of gate lines GL to drive the sub-pixels PX connected to the plurality of gate lines GL. The gate driving circuit GD may include a shift register, a level shifter, and the like.

The gate driving circuits GD may be connected to a bonding pad of the display panel 110 by a tape automated bonding (TAB) method, a chip on glass (COG) method, or a chip on panel (COP) method, or may be implemented in a GIP type and integrated in the display panel 110. Further, the plurality of gate signal generation circuits may be implemented by a chip on film (COF) method of mounting on a gate-circuit film connected to the display panel 110. Hereinafter, for convenience of description, a case in which the gate driving circuit GD includes a plurality of gate signal generation circuits, and the plurality of gate signal generation circuits are implemented in the GIP type and disposed in the non-display region NDA of the display panel 110 is exemplified.

The gate driving circuits GD sequentially supply scan signals of a transistor turn-on voltage or a transistor turn-off voltage to the plurality of gate lines GL under the control of the controller 130. When a specific gate line is opened by the gate driving circuit GD, the data driving circuit 120 converts the image data received from the controller 130 to an analog data signal and supplies the analog data signal to the plurality of data lines DL.

The data driving circuit 120 may be located at one side of the display panel 110. For example, the one side may be an upper side, a lower side, a left side, or a right side of the display panel 110. Further, the data driving circuit 120 may be located at both sides of the display panel 110 according to a driving method, a panel design method, and the like. For example, both sides may be upper and lower sides, or left and right sides of the display panel 110.

The gate driving circuit GD may be located at one side of the display panel 110. For example, the one side may be an upper side, a lower side, a left side, or a right side of the display panel 110. Further, the gate driving circuits GD may be located at both sides of the display panel 110 according to a driving method, a panel design method, and the like. For example, both sides may be upper and lower sides, or left and right sides of the display panel 110.

Hereinafter, an example in which the data driving circuit 120 is located at the upper side of the display panel 110 and the gate driving circuits GD are located on both the left and right sides of the display panel 110 is described. In this case, a width W of a region occupied by the gate driving circuit GD in the display panel 110 may be referred to as a bezel, and since there is an aesthetic effect of the electroluminescence display device 100 as the bezel is smaller, there is a demand to simplify the gate driving circuit GD in order to reduce the bezel. When the gate driving circuit GD is simplified, driving is also simplified and thus power consumption may be reduced.

The plurality of gate lines GL disposed on the display panel 110 may include a plurality of scan lines and a plurality of emission control lines. The plurality of scan lines and the plurality of emission control lines are lines which transmit different types of gate signals to gate nodes of different transistors.

Accordingly, the gate driving circuit GD may include a plurality of scan driving circuits which output scan signals to the plurality of scan lines which are one type of the gate line GL, and a plurality of emission driving circuits which output emission control signals to the plurality of emission control lines which are another type of the gate line GL.

Figure 2:
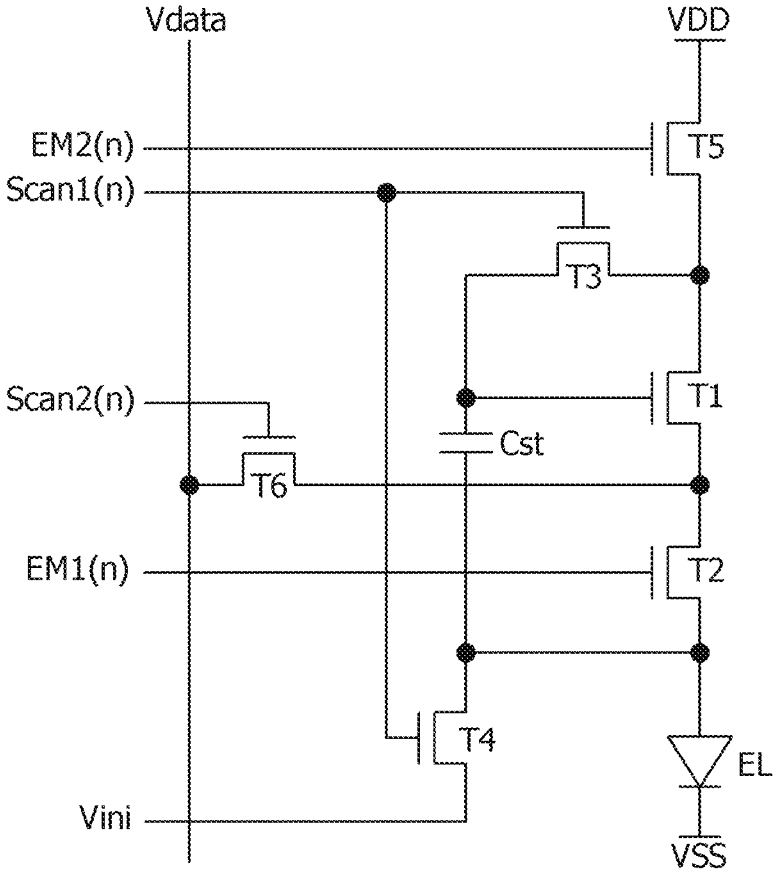
FIG. 2 is a circuit diagram of a pixel circuit according to one embodiment of the present specification.
Figure 3:
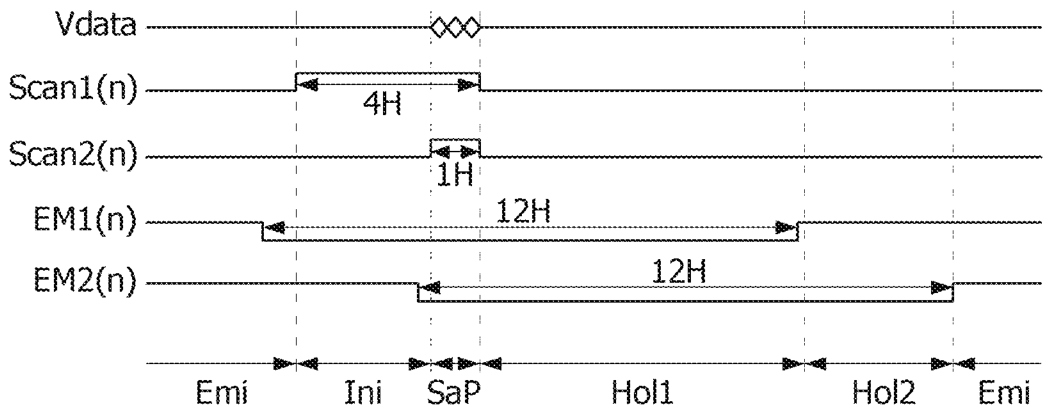
FIG. 3 is a waveform diagram of gate signals provided to the pixel circuit according to one embodiment of the present specification.

FIG. 2 is a circuit diagram of the pixel circuit according to one embodiment of the present specification, and FIG. 3 is a waveform diagram of the gate signals provided to the pixel circuit according to one embodiment of the present specification.

The display region DA includes the plurality of sub-pixels PX, and displays an image based on gradations respectively displayed by the sub-pixels PX. As mentioned above, for example, each sub-pixel PX is connected to the data line DL arranged along a column line, and is connected to the gate line GL is arranged along a row line (pixel line). In this case, the sub-pixels PX located on the same row line are referred to as pixel lines, and the sub-pixels PX located on the same pixel line share the same gate line GL and simultaneously receive the gate signal. Accordingly, the sub-pixels PX connected to a first gate line may be referred to as a first pixel line, and the sub-pixels PX connected to an nth gate line may be referred to as an nth pixel line. When the number of pixel lines disposed in the display region DA is p, the first pixel line to the pth pixel line may be sequentially driven in synchronization with the gate signal generation circuit.

Referring to FIGS. 2 and 3, the sub-pixel PX includes a light emitting element EL and a pixel circuit which controls an amount of current applied to an anode of the light emitting element EL. The pixel circuit includes six transistors T1, T2, T3, T4, T5, and T6 and one storage capacitor Cst. All of the transistors included in the pixel circuit are n-type transistors and may be implemented as oxide transistors.

The pixel circuit according to one embodiment of the present specification will be described by taking the pixel circuit included in the n-th pixel line as an example. The pixel circuit is provided with a first scan signal Scan1(*n*), a second scan signal Scan2(*n*), a first emission signal EM1(*n*), a second emission signal EM2(*n*), a data voltage Vdata, a high potential voltage VDD, an initialization voltage Vini, and a low potential voltage VSS. The first scan signal Scan1(*n*) and the second scan signal Scan2(*n*) are output from the scan driving circuit included in the gate driving circuit GD, and the first emission signal EM1(*n*) and the second emission signal EM2(*n*) are output from the emission driving circuit included in the gate driving circuit GD. Generally, a driving circuit which outputs a signal for each signal is separately provided, but in the gate driving circuit GD according to one embodiment of the present specification, the driving circuit which outputs the first scan signal Scan1(*n*) and the second scan signal Scan2(*n*) is a single scan driving circuit. The data voltage Vdata is output from the data driving circuit 120. Further, the high potential voltage VDD, the initialization voltage Vini, and the low potential voltage VSS are output from a power generator as power voltages and are provided to the pixel circuit.

The pixel circuit compensates for a threshold voltage of the driving transistor while being driven according to an initialization period Ini, a sampling and programming period SaP, holding periods Hol1 and Hol2, and an emission period Emi, and the driving transistor provides a driving current to the light emitting element EL. In this case, the driving transistor is referred to as a first transistor T1.

The first transistor T1 includes a gate electrode, a source electrode, and a drain electrode, and the source electrode is electrically connected to the light emitting element EL to provide a driving current.

The emission period ends when the first emission signal EM1(*n*) is switched to a low voltage, and an initialization period Ini starts when the first scan signal Scan1(*n*) is switched to a high voltage. In the initialization period Ini, the second emission signal EM2(*n*) maintains the high voltage.

A second transistor T2 is turned off according to the first emission signal EM1(*n*) to block the driving current provided to the light emitting element EL from the first transistor T1. A gate electrode of the second transistor T2 is connected to the first emission line provided with the first emission signal EM1(*n*), a source electrode is connected to the source electrode of the first transistor T1, and a drain electrode is connected to the anode of the light emitting element EL.

The remaining transistors T2, T3, T4, T5, and T6 other than the first transistor T1 are switching transistors, and the source electrodes and the drain electrodes may be changed in some cases.

Subsequently, a third transistor T3 and a fourth transistor T4 are turned on according to the first scan signal Scan1(*n*). Further, a fifth transistor T5 maintains a turned-on state according to the second emission signal EM2(*n*).

A gate electrode of the third transistor T3 is connected to a first scan line provided with the first scan signal Scan1(*n*), and a source electrode and a drain electrode are respectively connected to the gate electrode and the drain electrode of the first transistor T1.

A gate electrode of the fourth transistor T4 is connected to the first scan line, a source electrode is connected to an initialization line provided with the initialization voltage Vini, and a drain electrode is connected to the anode of the light emitting element EL.

A gate electrode of the fifth transistor T5 is connected to a second emission line provided with the second emission signal EM2(*n*), a source electrode is connected to the drain electrode of the first transistor T1, and a drain electrode is connected to a high potential line provided with the high potential voltage VDD.

In the initialization period Ini, the third transistor T3 is turned on to connect the gate electrode and the drain electrode of the first transistor T1 and set the gate electrode and the drain electrode of the first transistor T1 to the same voltage. Since the fifth transistor T5 is turned on in the initialization period Ini, the gate electrode and the drain electrode of the first transistor T1 become the high potential voltage VDD by the third transistor T3.

In the initialization period Ini, the fourth transistor T4 is turned on to provide the initialization voltage Vini to the light emitting element EL and discharge the anode of the light emitting element EL to the initialization voltage Vini.

Subsequently, the sampling and programming period SaP starts as the second emission signal EM2(*n*) is switched to a low voltage and the second scan signal Scan2(*n*) is switched to a high voltage. In the sampling and programming period SaP, the first scan signal Scan1(n) maintains the high voltage, and the first emission signal EM1(n) maintains the low voltage.

The fifth transistor T5 is turned off according to the second emission signal EM2(n) to cut off the high potential voltage VDD provided to the first transistor T1. Further, a sixth transistor T6 is turned on according to the second scan signal Scan2(n) to provide the data voltage Vdata to the source electrode of the first transistor T1.

A gate electrode of the sixth transistor T6 is connected to the second scan line, a source electrode is connected to the source electrode of the first transistor T1, and a drain electrode is connected to the data line DL provided with the data voltage Vdata.

Since the gate electrode and the drain electrode of the first transistor T1 are electrically connected by the third transistor T3 which maintains the turned-on state in the sampling and programming period SaP, the first transistor T1 is in a diode-connected state, and in this case, since the sixth transistor T6 is turned on to provide the data voltage Vdata to the drain electrode of the first transistor T1, the voltage of the gate electrode of the first transistor T1 decreases until a difference between the voltage of the gate electrode and the voltage of the source electrode of the first transistor T1 becomes a threshold voltage of the first transistor T1.

Meanwhile, a first electrode of the storage capacitor Cst is connected to the gate electrode of the first transistor T1, and a second electrode is connected to the anode of the light emitting element EL. In the sampling and programming period SaP, a voltage of a difference between the data voltage Vdata and the threshold voltage of the first transistor T1 is applied to the first electrode of the storage capacitor Cst, and the initialization voltage Vini is applied to the second electrode of the storage capacitor Cst by the fourth transistor T4 which maintains the turned-on state to charge the storage capacitor Cst.

The high voltage of the first scan signal Scan1(n) may be four horizontal periods 4H, and the high voltage of the second scan signal Scan2(n) may be one horizontal period 1H, but the present disclosure is not limited thereto. The high voltages of the first scan signal Scan1 (n) and the second scan signal Scan2(n) may be implemented to have the same length.

According to the first scan signal Scan1(n) and the second scan signal Scan2(n), the initialization period Ini is three horizontal periods 3H, and the sampling and programming period SaP is one horizontal period 1H, but the present disclosure is not limited thereto. Similarly, the initialization period Ini and the sampling and programming period SaP may be implemented to have the same length.

However, when the initialization period Ini is set longer than the sampling and programming period SaP, a clear black may be realized when a black screen is displayed on the electroluminescent display device. Specifically, a pulse width of the first scan signal Scan1(n) may be at least twice a pulse width of the second scan signal Scan2(n).

Subsequently, a first holding period Hol1 starts as the first scan signal Scan1(n) and the second scan signal Scan2(n) are switched to a low voltage. In the first holding period Hol1, the first emission signal EM1(n) and the second emission signal EM2(n) each maintain the low voltage.

In the first holding period Hol1, a buffer time for a time in which the first scan signal Scan1(n) and the second scan signal Scan2(n) are switched to low voltages in a state in which all transistors T1, T2, T3, T4, T5, and T6 are turned-off state is provided. The first holding period Hol1 ends as the first emission signal EM1(n) is switched to the high voltage, and a second holding period Hol2 starts. The first holding period Hol1 may be 7 horizontal periods 7H, but the present disclosure is not limited thereto.

In the second holding period Hol2, the second transistor T2 is turned on by the first emission signal EM1(n) to electrically connect the source electrode of the first transistor T1 and the anode of the light emitting element EL. The initialization voltage Vini is provided to the source electrode of the first transistor T1, and the voltages of the gate electrode and the source electrode of the first transistor T1 are constantly maintained by the voltage charged in the storage capacitor Cst. The second holding period Hol2 ends as the second emission signal EM2(n) is switched to the high voltage, and the emission period Emi starts. The second holding period Hol2 may be four horizontal periods 4H, but is not limited thereto.

In the emission period Emi, the fifth transistor T5 is turned on by the second emission signal EM2(n) to provide the high potential voltage VDD to the drain electrode of the first transistor T1. Accordingly, the first transistor T1 is turned on to provide the driving current to the anode of the light emitting element EL, and the light emitting element EL emits light.

The low voltages of the first emission signal EM1(n) and the second emission signal EM2(n) may have the same length. For example, the first emission signal EM1(n) and the second emission signal EM(n) may have 12 horizontal periods 12H, but the present disclosure is not limited thereto. The first emission signal EM1(n) maintains the low voltage when the first scan signal Scan1(n) and the second scan signal Scan2(n) are the high voltages, and the second emission signal EM2(n) maintains the low voltage when the second scan signal Scan2(n) is the high voltage and the first emission signal EM1(n) is switched to the high voltage.

The pixel circuit according to one embodiment of the present specification includes oxide transistors controlled by the first scan signal Scan1(n) and the second scan signal Scan2(n), and through the first scan signal Scan1(n) and the second scan signal Scan2(n), power consumption may be reduced and a clearer black screen may be implemented by designing the initialization period Ini to be longer than the sampling and programming period SaP. Hereinafter, the gate driving circuits GD which output the first scan signal Scan1(n) and the second scan signal Scan1(n) will be described.

Figure 4:
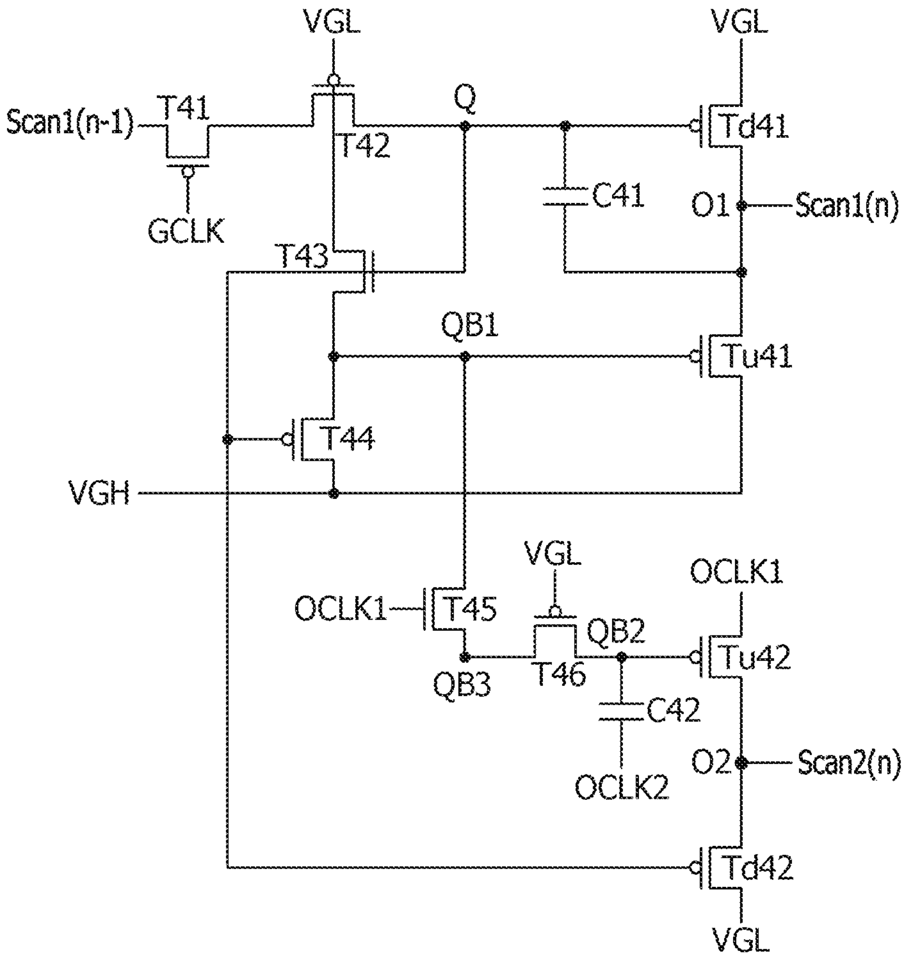
FIG. 4 is a circuit diagram of a gate driving circuit according to one embodiment of the present specification.
Figure 5:
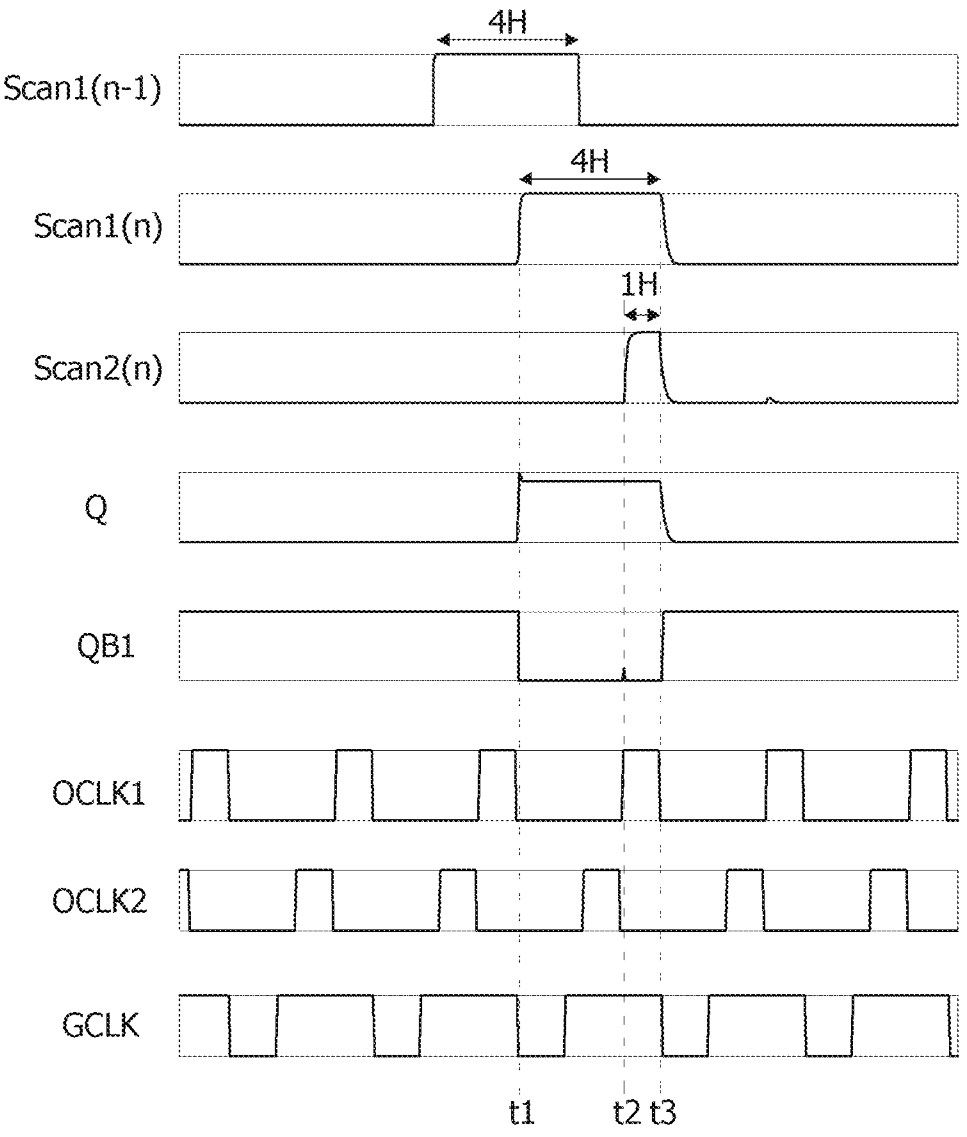
FIG. 5 is a waveform diagram of signals provided to the gate driving circuit according to one embodiment of the present specification.

FIG. 4 is a circuit diagram of the gate driving circuit GD according to one embodiment of the present specification, and FIG. 5 is a waveform diagram of the signals provided to the gate driving circuit GD according to one embodiment of the present specification.

The gate signal for driving the sub-pixels PX included in the display panel 110 includes a scan signal and an emission signal. Accordingly, the gate driving circuit GD may separately include a scan signal generation circuit which outputs the scan signal and an emission signal generation circuit which outputs the emission signal. The scan signal is applied to the pixel line through the scan line, and the emission signal is applied to the pixel line through the emission line.

FIG. 4 illustrates only the scan signal generation circuit which outputs the scan signal. Specifically, when the number of pixel lines included in the display region DA is p, the scan signal generation circuit according to one embodiment of the present specification includes a first scan signal generation circuit to a pth scan signal generation circuit. FIG. 4 illustrates an nth scan signal generation circuit which outputs a scan signal input to an n-th pixel line among the scan signal generation circuits. In this case, p and n are natural numbers, and 1≤n≤p.

The nth scan signal generation circuit is a single circuit which outputs both the first scan signal Scan1(*n*) and the second scan signal Scan1(*n*). Clock signals and constant voltages are input to the nth scan signal generation circuit. The clock signals are signals which swing between a low voltage and a high voltage with a constant period and include a start clock signal GCLK, a first output clock signal OCLK1, and a second output clock signal OCLK2, and the constant voltages include a low voltage VGL and a high voltage VGH. For example, the low voltage VGL may be −4.5V to −6.5V, and the high voltage VGH may be 12V to 13V.

The start clock signal GCLK and the output clock signals OCLK1 and OCLK2 have different periods. The output clock signals OCLK1 and OCLK2 are four-phase clock signals, and the first output clock signal OCLK1 and the second output clock signal OCLK2 are used in the nth scan signal generation circuit. The scan signal generation circuit may be classified into odd-numbered pixel lines and even-numbered pixel lines to sequentially output scan signals. For example, when n is an odd number, the scan signal generation circuit providing the scan signal to the even-numbered pixel lines may use two clock signals other than the first output clock signal OCLK1 and the second output clock signal OCLK2 among four-phase clocks.

The high voltage pulse widths of the first output clock signal OCLK1 and the second output clock signal OCLK2 correspond to approximately one horizontal period. Further, the high voltage pulse width of the start clock signal GCLK is greater than the high voltage pulse width of the output clock signal.

The nth scan signal generation circuit provides the first scan signal Scan1(*n*) to the nth pixel line while shifting the start signal in response to the start clock signal GCLK, and provides the second scan signal Scan2(*n*) to the nth pixel line in response to the first output clock signal OCLK1. In this case, the start signal is the first scan signal Scan1(*n*−1) provided to an n−1th pixel line. For example, when n is an odd number, the first scan signal Scan1(*n*−1) provided to the n−1th pixel line as a start signal refers to an odd-numbered pixel line before n. For example, when n is 99, n−1 refers to 97. Further, when n is an even number, the first scan signal Scan1(*n*−1) provided to the n−1th pixel line as the start signal refers to an even-numbered pixel line before n. For example, when n is 104, n−1 refers to 102.

The scan signal generation circuit according to one embodiment of the present specification includes a first pull-down circuit, a first pull-up circuit, a second pull-down circuit, a second pull-up circuit, a Q node control circuit, a QB1 node control circuit, and a QB2 node control circuit. Further, the scan signal generation circuit according to one embodiment of the present specification includes both an n-type transistor and a p-type transistor. Since the transistors constituting the nth scan signal generation circuit are switching transistors which switch voltages, source electrodes and drain electrodes may be interchanged in some cases.

The first pull-down circuit is controlled by a voltage of a Q node to output the low voltage VGL to a first output node O1, and the first pull-up circuit is controlled by a voltage of a QB1 node to output the high voltage VGH to the first output node O1.

The first pull-down circuit includes a first pull-down transistor Td41 and a first capacitor C41. The first pull-down transistor Td41 is a p-type transistor, a gate electrode is connected to the Q node, a source electrode is connected to a line provided with the low voltage VGL, and a drain electrode is connected to the first output node O1. A first electrode of the first capacitor C41 is connected to the Q node, and a second electrode of the first capacitor C41 is connected to the first output node O1.

The first pull-up circuit includes a first pull-up transistor Tu41. The first pull-up transistor Tu41 is a p-type transistor, a gate electrode is connected to the QB1 node, a source electrode is connected to a line provided with the high voltage VGH, and a drain electrode is connected to the first output node O1.

The second pull-down circuit is controlled by the voltage of the Q node to output the low voltage VGL to a second output node O2, and the second pull-up circuit is controlled by a voltage of a QB2 node to output the first output clock signal OCLK1 to the second output node O2.

The second pull-down circuit includes a second pull-down transistor Td42. The second pull-down transistor Td42 is a p-type transistor, a gate electrode is connected to the Q node, a source electrode is connected to a line provided with the low voltage VGL, and a drain electrode is connected to the second output node O2.

The second pull-up circuit includes a second pull-up transistor Tu42 and a second capacitor C42. The second pull-up transistor Tu42 is a p-type transistor, a gate electrode is connected to the QB2 node, a source electrode is connected to a line provided with the first output clock signal OCLK1, and a drain electrode is connected to the second output node O2. A first electrode of the second capacitor C42 is connected to the QB2 node, and a second electrode of the second capacitor C42 is connected to a line provided with the second output clock signal OCLK2.

The Q node control circuit is a circuit for charging or discharging the Q node, and applies a high voltage or a low voltage to the Q node using the start signal Scan1(*n*−1).

The Q node control circuit includes a first transistor T41 and a second transistor T42. The first transistor T41 is a p-type transistor, a gate electrode of the first transistor T41 is connected to a line provided with the start clock signal GCLK, a source electrode is connected to a line provided with the first scan signal Scan1(*n*−1) which is a start signal output from the n−1th scan signal generation circuit, and a drain electrode is connected to the source electrode of the second transistor T42. The first transistor T41 is controlled by the start clock signal GCLK and applies the first scan signal Scan1(*n*−1) output from the n−1th scan signal generation circuit to the source electrode of the second transistor T42.

Further, the second transistor T42 is a p-type transistor, a gate electrode of the second transistor T42 is connected to a line provided with the low voltage VGL, the source electrode is connected to the drain electrode of the first transistor T41, and a drain electrode is connected to the Q node. The second transistor T42 is always turned on by the low voltage VGL and electrically connects the drain electrode of the first transistor T41 and the Q node. In the scan signal generation circuit according to one embodiment of the present specification, the Q node control circuit applies a start signal to the Q node by the start clock signal GCLK.

The QB1 node control circuit is a circuit for charging or discharging the QB1 node, and applies the high voltage VGH or the low voltage VGL to the QB1 node according to a Q node voltage applied by the Q node control circuit.

The QB1 node control circuit includes a third transistor T43 and a fourth transistor T44. The third transistor T43 is an n-type transistor, a gate electrode of the third transistor T43 is connected to the Q node, a source electrode is connected to the QB1 node, and a drain electrode is connected to a line provided with the low voltage VGL. The third transistor T43 is controlled by the Q node to apply the low voltage VGL to the QB1 node. Further, the fourth transistor T44 is a p-type transistor, a gate electrode of the fourth transistor T44 is connected to the Q node, a source electrode is connected to a line provided with the high voltage VGH, and a drain electrode is connected to the QB1 node.

The fourth transistor T44 is controlled by the Q node to apply the high voltage VGH to the QB1 node. In the scan signal generation circuit according to one embodiment of the present specification, the QB1 node control circuit may include n-type and p-type transistors, and thus may adjust the voltage of the QB1 node using the Q node.

The QB2 node control circuit is a circuit for charging or discharging the QB2 node, and applies the voltage of the QB1 node to the QB2 node according to the first output clock signal OCLK1.

The QB2 node control circuit includes a fifth transistor T45, a sixth transistor T46, and the second capacitor C42. The fifth transistor T45 is an n-type transistor, a gate electrode of the fifth transistor T45 is connected to a line provided with the first output clock signal OCLK1, a source electrode is connected to a source electrode of the sixth transistor T46, and a drain electrode is connected to the QB1 node. The fifth transistor T45 is controlled by the first output clock signal OCLK1 to apply the voltage of the QB1 node to a QB3 node.

The sixth transistor T46 is a p-type transistor, a gate electrode of the sixth transistor T46 is connected to a line provided with the low voltage VGL, the source electrode is connected to the QB3 node, and a drain electrode is connected to the QB2 node. The sixth transistor T46 is always turned on by the low voltage VGL and electrically connects the source electrode of the fifth transistor T45 and the QB2 node. Further, the first electrode of the second capacitor C42 is connected to the QB2 node, and the second electrode is connected to a line provided with the second output clock signal OCLK2.

In the scan signal generation circuit according to one embodiment of the present specification, the QB2 node control circuit may include n-type and p-type transistors, and thus may adjust the voltage of the QB2 node using the output clock signal.

Hereinafter, in the scan signal generation circuit according to one embodiment of the present specification, signals input to the scan signal generation circuit and operations of respective components (driving circuits) according thereto will be described.

Assuming that a time when the start clock signal GCLK is switched from a high voltage to a low voltage is a first point t1, the first transistor T41 is turned on at the first point t1, and thus the first scan signal Scan1 (n−1) provided to the n−1th pixel line is applied to the Q node. In this case, since the first scan signal Scan1(*n*−1) provided to the n−1th pixel line is a high voltage, the Q node is in a high voltage state. The first pull-down transistor Td41, the fourth transistor T44, and the second pull-down transistor Td42 are turned off by the high voltage of the Q node, and the third transistor T43 is turned on to apply the low voltage to the QB1 node. The first pull-up transistor Tu41 is turned on by the QB1 node to output the high voltage VGH to the first output node O1. Further, since the first output clock signal OCLK1 is switched from a high voltage to a low voltage at the first point t1, the fifth transistor T45 is also turned off.

In the scan signal generation circuit according to one embodiment of the present specification, the start clock signal GCLK is synchronized with a pulse edge switched from the high voltage to the low voltage, and the high voltage VGH is provided to the nth pixel line as the first scan signal Scan1(*n*).

A state in which the first scan signal Scan1(*n*) is output as the high voltage VGH is maintained even after the start clock signal GCLK is switched from the low voltage to the high voltage.

Subsequently, assuming that a time when the first output clock signal OCLK1 is switched from the low voltage to the high voltage and the second output clock signal OCLK2 is the low voltage is a second point t2, the fifth transistor T45 is turned on at the second point t2 to apply the voltage of the QB1 node to the QB2 node. In this case, since the voltage of the QB1 node is the low voltage, the QB2 node is also in a low voltage state. Since the second pull-up transistor Tu42 is turned on by the low voltage of the QB2 node, the high voltage of the first output clock signal OCLK1 is output to the second output node O2. When the high voltage of the first output clock signal OCLK1 is output, since the second output clock signal OCLK2 is a low voltage, the voltage at the QB2 node is further lowered due to a bootstrapping phenomenon of the second capacitor C42, and the second pull-up transistor Tu42 maintains a turned-on state well. Further, the second pull-down transistor Td42 maintains a turned-off state by the Q node.

In the scan signal generation circuit according to one embodiment of the present specification, the first output clock signal OCLK1 is synchronized with the pulse edge switched from the low voltage to the high voltage, and the first output clock signal OCLK1 is provided to the nth pixel line as the second scan signal Scan2(*n*).

Assuming that a time when the start clock signal GCLK is switched from the high voltage to the low voltage and the first output clock signal OCLK1 is switched from the high voltage to the low voltage is a third point t3, the first scan signal Scan1(*n*−1) provided to the n−1th pixel line is applied to the Q node while the fifth transistor T45 is turned off and the first transistor T41 is turned on at the third point t3. In this case, since the voltage of the first scan signal Scan1 (n−1) provided to the n−1th pixel line is the low voltage, the Q node is also in a low voltage state. The first pull-down transistor Td41 is turned on by the low voltage of the Q node, and the low voltage VGL is output to the first output node O1.

The third transistor T43 is turned off, and the fourth transistor T44 and the second pull-down transistor Td42 are turned on by the low voltage of the Q node. The turned-on fourth transistor T44 applies the high voltage VGH to the QB1 node. The first pull-up transistor Tu41 is turned off by the QB1 node. Further, since the first output clock signal OCLK1 is switched from the high voltage to the low voltage at the third point t3, the fifth transistor T45 is also turned off. In addition, the low voltage VGL is output to the second output node O2 by the turned-on second pull-down transistor Td42.

In the scan signal generation circuit according to one embodiment of the present specification, the start clock signal GCLK is synchronized with the pulse edge switched from the high voltage to the low voltage and the low voltage VGL is provided to the nth pixel line as the first scan signal Scan1(*n*), and the first output clock signal OCLK1 is synchronized with the pulse edge switched from the high voltage to the low voltage, the low voltage VGL is provided to the nth pixel line as the second scan signal Scan2(*n*).

In the scan signal generation circuit according to one embodiment of the present specification, the pulse width of the high voltage of the first scan signal Scan1(*n*) corresponds to the pulse width of the high voltage of the Q node. That is, the pulse width of the first scan signal Scan1(*n*) is the same as the pulse width of the Q node.

In the scan signal generation circuit according to one embodiment of the present specification, the pulse width of the high voltage of the second scan signal Scan2(*n*) corresponds to the pulse width of the high voltage of the first output clock signal OCLK1. That is, the pulse width of the second scan signal Scan2(*n*) is the same as the pulse width of the first output clock signal OCLK1.

According to embodiments of the present specification, since a threshold voltage shift margin of the transistor may be secured by including at least one oxide transistor in the scan signal generation circuit, the reliability of the gate driving circuits may be improved.

Figure 6:
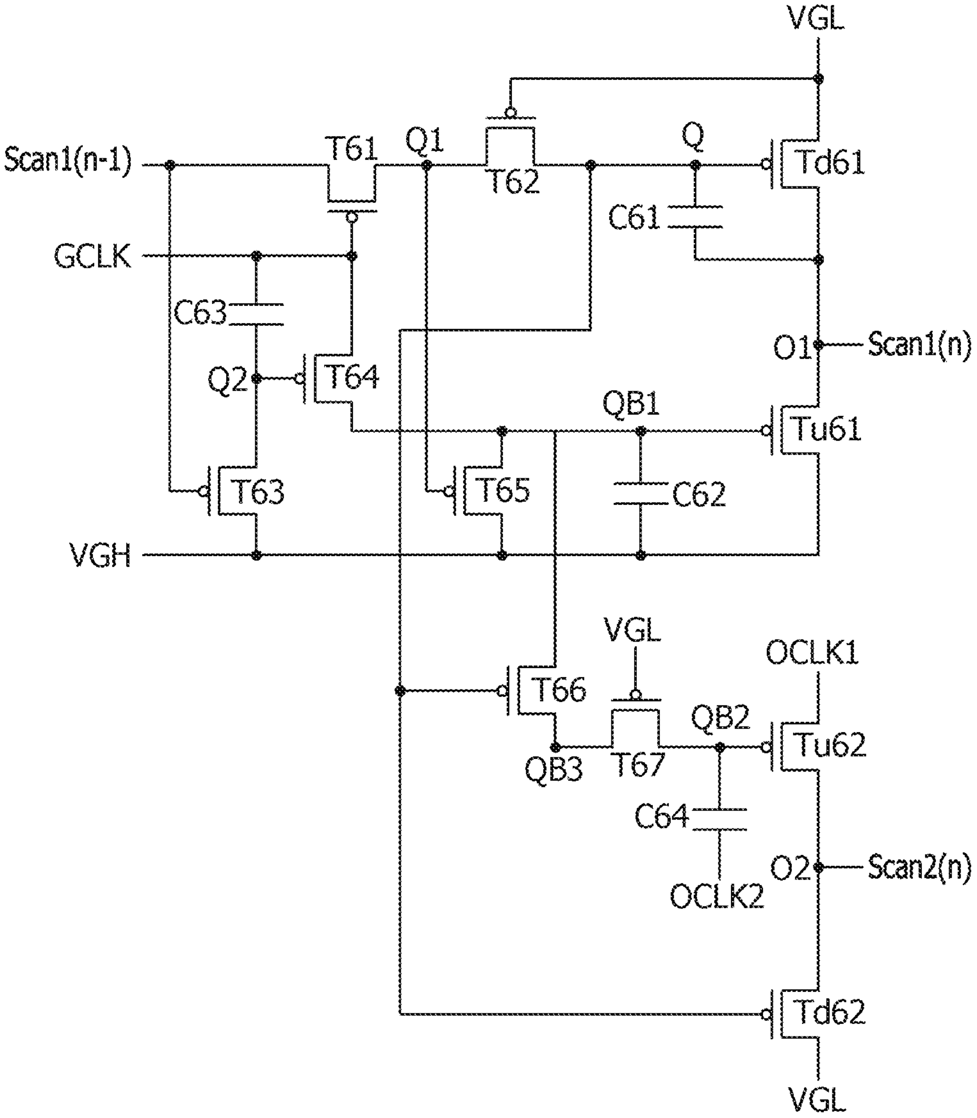
FIG. 6 is a circuit diagram of a gate driving circuit according to another embodiment of the present specification.

FIG. 6 is a circuit diagram of a gate driving circuit according to another embodiment of the present specification. A waveform diagram of signals provided to the gate driving circuit according to another embodiment of the present specification is the same as FIG. 5. Overlapping descriptions for the signals in FIG. 5 will be omitted.

FIG. 6 illustrates an nth scan signal generation circuit which outputs a scan signal input to an nth pixel line like FIG. 4. The nth scan signal generation circuit is a single circuit which outputs both a first scan signal Scan1(*n*) and a second scan signal Scan2(*n*). The nth scan signal generation circuit includes a start clock signal GCLK, a first output clock signal OCLK1, and a second output clock signal OCLK2, and constant voltages include a low voltage VGL and a high voltage VGH.

The scan signal generation circuit according to another embodiment of the present specification includes a first pull-down circuit, a first pull-up circuit, a second pull-down circuit, a second pull-up circuit, a Q node control circuit, a QB1 node control circuit, and a QB2 node control circuit. Further, the scan signal generation circuit according to another embodiment of the present specification includes p-type transistors. Since the transistors constituting the nth scan signal generation circuit are switching transistors which switch voltages, source electrodes and drain electrodes may be interchanged in some cases.

The first pull-down circuit is controlled by a voltage of a Q node to output the low voltage VGL to a first output node O1, and the first pull-up circuit is controlled by a voltage of a QB1 node to output the high voltage VGH to the first output node O1.

The first pull-down circuit includes a first pull-down transistor Td61 and a first capacitor C61. The first pull-down transistor Td61 is a p-type transistor, a gate electrode is connected to the Q node, a source electrode is connected to a line provided with the low voltage VGL, and a drain electrode is connected to the first output node O1. A first electrode of the first capacitor C61 is connected to the Q node, and a second electrode of the first capacitor C61 is connected to the first output node O1.

The first pull-up circuit includes a first pull-up transistor Tu61 and a second capacitor C62. The first pull-up transistor Tu61 is a p-type transistor, a gate electrode is connected to the QB1 node, a source electrode is connected to a line provided with the high voltage VGH, and a drain electrode is connected to the first output node O1. A first electrode of the second capacitor C62 is connected to the QB1 node, and a second electrode of the second capacitor C62 is connected to a line provided with the high voltage VGH.

The second pull-down circuit is controlled by the voltage of the Q node to output the low voltage VGL to a second output node O2, and the second pull-up circuit is controlled by a voltage of a QB2 node to output the first output clock signal OCLK1 to the second output node O2.

The second pull-down circuit includes a second pull-down transistor Td62. The second pull-down transistor Td62 is a p-type transistor, a gate electrode is connected to the Q node, a source electrode is connected to a line provided with the low voltage VGL, and a drain electrode is connected to the second output node O2.

The second pull-up circuit includes a second pull-up transistor Tu62 and a fourth capacitor C64. The second pull-up transistor Tu62 is a p-type transistor, a gate electrode is connected to the QB2 node, a source electrode is connected to a line provided with the first output clock signal OCLK1, and a drain electrode is connected to the second output node O2. A first electrode of the fourth capacitor C64 is connected to the QB2 node, and a second electrode of the fourth capacitor C64 is connected to a line provided with the second output clock signal OCLK2.

The Q node control circuit is a circuit for charging or discharging the Q node, and applies a high voltage or a low voltage to the Q node using the start signal Scan1(*n*−1).

The Q node control circuit includes a first transistor T61 and a second transistor T62. The first transistor T61 is a p-type transistor, a gate electrode of the first transistor T61 is connected to a line provided with the start clock signal GCLK, a source electrode is connected to a line provided with the first scan signal Scan1(*n*−1) which is a start signal output from the n−1th scan signal generation circuit, and a drain electrode is connected to the Q1 node. The first transistor T61 is controlled by the start clock signal GCLK and applies the first scan signal Scan1(*n*−1) output from the n−1th scan signal generation circuit to the Q1 node. Further, the second transistor T62 is a p-type transistor, a gate electrode of the second transistor T62 is connected to a line provided with the low voltage VGL, a source electrode is connected to the Q1 node, and a drain electrode is connected to the Q node. The second transistor T62 is always turned on by the low voltage VGL and electrically connects the Q1 node and the Q node. In the scan signal generation circuit according to another embodiment of the present specification, the Q node control circuit applies the start signal Scan1(*n*−1) to the Q node by the start clock signal GCLK.

The QB1 node control circuit is a circuit for charging or discharging the QB1 node, and applies the high voltage or the low voltage to the QB1 node using the Q2 node, the start clock signal GCKL, and the start signal Scan1 (n−1).

The QB1 node control circuit includes a third transistor T63, a fourth transistor T64, a fifth transistor T65, and a third capacitor C63. The third transistor T63 is a p-type transistor, a gate electrode of the third transistor T63 is connected to a line provided with the start signal Scan1(*n*−1), a source electrode is connected to a line provided with the high voltage VGH, and a drain electrode is connected to the Q2 node. The third transistor T63 is controlled by the start signal Scan1(*n*−1) to apply the high voltage VGH to the Q2 node.

The fourth transistor T64 is a p-type transistor, a gate electrode of the fourth transistor T64 is connected to the Q2 node, a source electrode is connected to a line provided with the start clock signal GCLK, and a drain electrode is connected to the QB1 node. The fourth transistor T64 is controlled by the Q2 node to apply the start clock signal GCLK to the QB1 node.

The fifth transistor T65 is a p-type transistor, a gate electrode of the fifth transistor T65 is connected to the Q1 node, a source electrode is connected to a line provided with the high voltage VGH, and a drain electrode is connected to the QB1 node. The fifth transistor T65 is controlled by the Q1 node to apply the high voltage VGH to the QB1 node.

A first electrode of the third capacitor C63 is connected to the start clock signal GCLK, and a second electrode of the third capacitor C63 is connected to the Q2 node.

In the scan signal generation circuit according to another embodiment of the present specification, the QB1 node control circuit may adjust the voltage of the QB1 node using the start signal Scan1 (n−1), the start clock signal GCKL, and the Q1 node.

The QB2 node control circuit is a circuit for charging or discharging the QB2 node, and applies the voltage of the QB1 node to the QB2 node according to the voltage of the Q node.

The QB2 node control circuit includes a sixth transistor T66, a seventh transistor T67, and the fourth capacitor C64. The sixth transistor T66 is a p-type transistor, a gate electrode of the sixth transistor T66 is connected to the Q node, a source electrode is connected to the QB1 node, and a drain electrode is connected to a QB3 node. The sixth transistor T66 is controlled by the Q node to apply the voltage of the QB1 node to the QB3 node.

The seventh transistor T67 is a p-type transistor, a gate electrode of the seventh transistor T67 is connected to a line provided with the low voltage VGL, a source electrode is connected to the QB3 node, and a drain electrode is connected to the QB2 node. The seventh transistor T67 is always turned on by the low voltage VGL and electrically connects the drain electrode of the sixth transistor T66 to the QB2 node.

The first electrode of the fourth capacitor C64 is connected to the QB2 node, and the second electrode of the fourth capacitor C64 is connected to a line provided with the second output clock signal OCLK2.

In the scan signal generation circuit according to another embodiment of the present specification, the QB2 node control circuit may adjust the voltage of the QB2 node using the Q node and the QB1 node.

Hereinafter, in the scan signal generation circuit according to another embodiment of the present specification, signals input to the scan signal generation circuit and operations of respective components (driving circuits) according thereto will be described.

Assuming that a time when the start clock signal GCLK is switched from the high voltage to the low voltage is a first point t1, the first transistor T61 is turned on at the first point t1, and thus the first scan signal Scan1(*n*−1) provided to the n−1th pixel line is applied to the Q node. In this case, since the first scan signal Scan1(*n*−1) provided to the n−1th pixel line is a high voltage, the Q node is in a high voltage state. The first pull-down transistor Td61, the sixth transistor T66, and the second pull-down transistor Td62 are turned off by the high voltage of the Q node. Further, the fifth transistor T65 is turned off by the high voltage of the Q1 node. In addition, the third transistor T63 is turned off by the first scan signal Scan1(*n*−1) provided to the n−1th pixel line.

The voltage of the Q2 node in a floating state is lowered due to a coupling phenomenon of the third capacitor C63 as the start clock signal GCLK is switched from the high voltage to the low voltage at the first point t1. Accordingly, the fourth transistor T64 is turned on and the low voltage of the start clock signal GCLK is applied to the QB1 node. The first pull-up transistor Tu61 is turned on by the low voltage of the QB1 node to output the high voltage VGH to the first output node O1. Further, the second capacitor C62 maintains the voltage of the QB1 node at a low voltage even when the start clock signal GCLK becomes the high voltage and the fourth transistor T64 is turned off.

In the scan signal generation circuit according to another embodiment of the present specification, the start clock signal GCLK is synchronized with a pulse edge switched from the high voltage to the low voltage, and the high voltage VGH is provided to the nth pixel line as the first scan signal Scan1(*n*).

Subsequently, assuming that a time when the first output clock signal OCLK1 is switched from the low voltage to the high voltage and the second output clock signal OCLK2 is the low voltage is a second point t2, the voltage of the QB2 node in a floating state is lowered due to a coupling phenomenon of the fourth capacitor C64 as the second output clock signal OCLK2 is switched from the high voltage to the low voltage at the second point t2. Accordingly, the second pull-up transistor Tu62 is turned on to output the high voltage of the first output clock signal OCLK1 to the second output node O2. Further, the second pull-down transistor Td62 maintains a turned-off state by the Q node.

In the scan signal generation circuit according to another embodiment of the present specification, the first output clock signal OCLK1 is synchronized with the pulse edge switched from the low voltage to the high voltage, and the first output clock signal OCLK1 is provided to the nth pixel line as the second scan signal Scan2(*n*).

Assuming that a time when the start clock signal GCLK is switched from the high voltage to the low voltage and the first output clock signal OCLK1 is switched from the high voltage to the low voltage is a third point t3, the first scan signal Scan1(*n*−1) provided to the n−1th pixel line is applied to the Q node while the first transistor T61 is turned on at the third point t3. In this case, since the voltage of the first scan signal Scan1(*n*−1) provided to the n−1th pixel line is the low voltage, the Q node is also in a low voltage state. The first pull-down transistor Td61 is turned on by the low voltage of the Q node, and the low voltage VGL is output to the first output node O1.

Since the Q node has the same voltage as the Q1 node, the fifth transistor T65 is turned on by the low voltage of the Q1 node and the high voltage VGH is applied to the QB1 node. The first pull-up transistor Tu61 is turned off by the QB1 node.

The sixth transistor T66 and the second pull-down transistor Td62 are turned on by the Q node. The low voltage of the QB1 node is applied to the QB2 node by the turned-on sixth transistor T66, and the second pull-up transistor Tu62 is turned on by the QB2 node and thus the low voltage of the first output clock signal OCLK1 is output to the second output node O2. Further, the low voltage VGL is output to the second output node O2 by the turned-on second pull-down transistor Td62.

In the scan signal generation circuit according to another embodiment of the present specification, the start clock signal GCLK is synchronized with a pulse edge switched from the high voltage to the low voltage and the low voltage VGL is provided to the nth pixel line as the first scan signal Scan1(*n*), and the first output clock signal OCLK1 is synchronized with the pulse edge switched from the high voltage to the low voltage and the low voltage VGL is provided to the nth pixel line as the second scan signal Scan2(*n*).

In the scan signal generation circuit according to another embodiment of the present specification, the pulse width of the high voltage of the first scan signal Scan1(*n*) corresponds to the pulse width of the high voltage of the Q node. That is, the pulse width of the first scan signal Scan1($n$) is the same as the pulse width of the Q node.

In the scan signal generation circuit according to another embodiment of the present specification, the pulse width of the high voltage of the second scan signal Scan2($n$) corresponds to the pulse width of the high voltage of the first output clock signal OCLK1. That is, the pulse width of the second scan signal Scan2($n$) is the same as the pulse width of the first output clock signal OCLK1.

The gate driving circuit and the electroluminescent display device using the same according to the embodiment of the present specification may be described as follows.

The gate driving circuit according to one embodiment of the present specification includes a first pull-down circuit which is controlled by a Q node and transmits a low voltage to a first output node, a first pull-up circuit which is controlled by a QB1 node and transmits a high voltage to the first output node, a QB2 node control circuit which transmits a voltage of the QB1 node to a QB2 node, a second pull-down circuit which is controlled by the Q node and transmits a low voltage to a second output node, and a second pull-up circuit which is controlled by the QB2 node and transmits a high voltage of a first output clock signal to the second output node. A pulse width of a signal output to the first output node is the same as a pulse width of the Q node, and a pulse width of a signal output to the second output node is the same as a pulse width of the first output clock signal. Accordingly, it is possible to secure the reliability of the gate driving circuits and reduce a bezel of the electroluminescent display device.

According to another feature of the present specification, the pulse width of the signal output to the first output node may be at least twice the pulse width of the signal output to the second output node.

According to another feature of the present specification, the high voltage output to the second output node may be one horizontal period.

According to another feature of the present specification, the signal output to the second output node may be synchronized with a pulse edge of the first output clock signal.

According to another feature of the present specification, the QB2 node control circuit may include a first n-type transistor controlled by the first output clock signal and connected to the QB1 node and a QB3 node, a p-type transistor controlled by a low voltage and connected to the QB3 node and the QB2 node, and a capacitor connected to the QB2 node and a line provided with the second output clock signal.

According to another feature of the present specification, the gate driving circuit may further include a second n-type transistor controlled by the Q node and connected to a line provided with a low voltage and the QB1 node.

According to another feature of the present specification, the first n-type transistor and the second n-type transistor may be oxide transistors, and transistors included in the first pull-down circuit, the first pull-up circuit, the second pull-down circuit, and the second pull-up circuit may be p-type transistors.

According to another feature of the present specification, the QB2 node control circuit may include a first transistor controlled by the Q node and connected to the QB1 node and the QB3 node, a second transistor controlled by a low voltage and connected to the QB3 node and the QB2 node, and a capacitor connected to the QB2 node and the line provided with the second output clock signal.

The electroluminescence display device according to one embodiment of the present specification includes a display panel classified into a display region including a plurality of pixel lines including a plurality of pixels and a non-display region including a gate driving circuit providing a gate signal to the plurality of pixel lines, wherein each of the plurality of pixels includes a pixel circuit and a light emitting element, the pixel circuit includes a plurality of n-type transistors, and the gate driving circuit includes a p-type transistor. The pixel circuit includes a first transistor turned on in an initialization period, a second transistor turned on in a sampling and programming period, and a third transistor and a fourth transistor turned on in an emission period. The gate driving circuit provides a first scan signal for turning on the first transistor and a second scan signal for turning on the second transistor, and the first scan signal and the second scan signal use a first output signal output from a previous pixel line as a start signal, and are output by a start clock signal synchronized with the first scan signal and a first output clock signal synchronized with the second scan signal. Accordingly, it is possible to secure the reliability of the gate driving circuits and reduce a bezel of the electroluminescent display device.

According to another feature of the present specification, the first scan signal may be output through a first output node, and the second scan signal may be output through a second output node.

According to embodiments of the present specification, image quality of a display panel can be improved and power consumption can be reduced by implementing a gate driving circuit to be suitable for a pixel circuit implemented with oxide transistors.

Further, according to the embodiments of the present specification, a bezel region of the display panel can be reduced by using a gate signal generation circuit including both an n-type transistor and a p-type transistor.

In addition, according to the embodiments of the present specification, the bezel region of the display panel can be reduced by integrating a driving circuit which outputs two or more scan signals.

In addition, according to the embodiments of the present specification, since the gate driving circuit can secure a threshold voltage shift margin of the transistor by including at least one oxide transistor, the reliability of the gate driving circuit can be improved.

Since the problems, the solutions to the problems, and the contents of the specification disclosed in effects to be solved above do not specify essential features of the claims, the scope of the claims is not limited by the items described in the contents of the specification.

It will be apparent to those skilled in the art that various modifications and variations can be made in the gate driving circuit and the electroluminescence display device using the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A gate driving circuit, comprising:

a first pull-down circuit controlled by a Q node and configured to transmit a low voltage to a first output node;

a first pull-up circuit controlled by a QB1 node and configured to transmit a high voltage to the first output node;

a QB2 node control circuit configured to transmit a voltage of the QB1 node to a QB2 node;

a second pull-down circuit controlled by the Q node and configured to transmit the low voltage to a second output node; and a second pull-up circuit controlled by the QB2 node and configured to transmit a high voltage of a first output clock signal to the second output node, wherein a pulse width of a signal output to the first output node is the same as a pulse width of the Q node, wherein, in synchronization with a falling pulse edge of a start clock signal from the high voltage to the low voltage, the high voltage is output as the signal output to the first output node, wherein a pulse width of a signal output to the second output node is the same as a pulse width of the first output clock signal, and wherein, in synchronization with a rising pulse edge of the first output clock signal from the low voltage to the high voltage, the first output clock signal is output as the signal output to the second output node.

2. The gate driving circuit of claim 1, wherein the pulse width of the signal output to the first output node is at least twice the pulse width of the signal output to the second output node.

3. The gate driving circuit of claim 1, wherein the high voltage of the first output clock signal output to the second output node is one horizontal period.

4. The gate driving circuit of claim 1, wherein the signal output to the second output node is synchronized with the rising pulse edge of the first output clock signal.

5. The gate driving circuit of claim 1, wherein the QB2 node control circuit includes:

a first n-type transistor controlled by the first output clock signal and connected to the QB1 node and a QB3 node;

a p-type transistor controlled by the low voltage and connected to the QB3 node and the QB2 node; and a capacitor connected to the QB2 node and a line provided with a second output clock signal.

6. The gate driving circuit of claim 5, further comprising a second n-type transistor controlled by the Q node and connected to a line provided with the low voltage and the QB1 node.

7. The gate driving circuit of claim 6, wherein:

the first n-type transistor and the second n-type transistor are oxide transistors; and transistors included in the first pull-down circuit, the first pull-up circuit, the second pull-down circuit, and the second pull-up circuit are p-type transistors.

8. The gate driving circuit of claim 1, wherein the QB2 node control circuit includes:

a first transistor controlled by the Q node and connected to the QB1 node and a QB3 node;

a second transistor controlled by the low voltage and connected to the QB3 node and the QB2 node; and a capacitor connected to the QB2 node and a line provided with a second output clock signal.

9. An electroluminescence display device, comprising:

a display panel classified into a display region including a plurality of pixel lines including a plurality of pixels and a non-display region including a gate driving circuit providing a gate signal to the plurality of pixel lines, wherein:

each of the plurality of pixels includes a pixel circuit and a light emitting element, the pixel circuit includes a plurality of n-type transistors, the gate driving circuit includes a p-type transistor, the pixel circuit includes:

a first transistor turned on in an initialization period;

a second transistor turned on in a sampling and programming period; and a third transistor and a fourth transistor turned on in an emission period, the gate driving circuit provides a first scan signal for turning on the first transistor and a second scan signal for turning on the second transistor, and the first scan signal and the second scan signal use a first output signal output from a previous pixel line as a start signal, wherein the gate driving circuit includes:

a first pull-down circuit controlled by a Q node and configured to output a low voltage to a first output node;

a first pull-up circuit controlled by a QB1 node and configured to output a high voltage to the first output node;

a QB2 node control circuit configured to transmit a voltage of the QB1 node to a QB2 node;

a second pull-down circuit controlled by the Q node and configured to output the low voltage to a second output node; and a second pull-up circuit controlled by the QB2 node and configured to output a first output clock signal to the second output node, wherein the QB2 node control circuit includes:

a first oxide transistor controlled by the first output clock signal and connected to the QB1 node and a QB3 node;

a polycrystalline transistor controlled by the low voltage and connected to the QB3 node and the QB2 node; and a capacitor connected to the QB2 node and a line provided with a second output clock signal, wherein, in synchronization with a falling pulse edge of a start clock signal from the high voltage to the low voltage, the high voltage is output as the first scan signal, and wherein, in synchronization with a rising pulse edge of the first output clock signal from the low voltage to the high voltage, the first output clock signal is output as the second scan signal.

10. The electroluminescence display device of claim 9, wherein a pulse width of the start clock signal is larger than a pulse width of the first output clock signal.

11. The electroluminescence display device of claim 9, wherein a pulse width of the first scan signal is a multiple of a pulse width of the second scan signal.

12. The electroluminescence display device of claim 9, wherein a pulse width of the first scan signal is one horizontal period.

13. The electroluminescence display device of claim 9, wherein:

the first scan signal is output through the first output node; and the second scan signal is output through the second output node.

14. The electroluminescence display device of claim 9, further comprising a second oxide transistor controlled by the Q node and connected to a line provided with the low voltage and the QB1 node.

15. The electroluminescence display device of claim 14, wherein:

the first oxide transistor and the second oxide transistor are n-type transistors; and transistors included in the first pull-down circuit, the first pull-up circuit, the second pull-down circuit, and the second pull-up circuit are p-type transistors.

16. An electroluminescence display device, comprising:

a display panel classified into a display region including a plurality of pixel lines including a plurality of pixels and a non-display region including a gate driving circuit providing a gate signal to the plurality of pixel lines, wherein each of the plurality of pixels includes a pixel circuit and a light emitting element, and the gate driving circuit is used for supplying the gate signal to the pixel circuit, and wherein the gate driving circuit comprises:

a first pull-down circuit controlled by a Q node and configured to transmit a low voltage to a first output node;

a first pull-up circuit controlled by a QB1 node and configured to transmit a high voltage to the first output node;

a QB2 node control circuit configured to transmit a voltage of the QB1 node to a QB2 node;

a second pull-down circuit controlled by the Q node and configured to transmit the low voltage to a second output node; and a second pull-up circuit controlled by the QB2 node and configured to transmit a high voltage of a first output clock signal to the second output node, wherein a pulse width of a signal output to the first output node is the same as a pulse width of the Q node, wherein, in synchronization with a falling pulse edge of a start clock signal from the high voltage to the low voltage, the high voltage is output as the signal output to the first output node, wherein a pulse width of a signal output to the second output node is the same as a pulse width of the first output clock signal, and wherein, in synchronization with a rising pulse edge of the first output clock signal from the low voltage to the high voltage, the first output clock signal is output as the signal output to the second output node.

17. The electroluminescence display device of claim 16, wherein the QB2 node control circuit includes:

a first n-type transistor controlled by the first output clock signal and connected to the QB1 node and a QB3 node;

a p-type transistor controlled by the low voltage and connected to the QB3 node and the QB2 node; and a capacitor connected to the QB2 node and a line provided with a second output clock signal.

18. The electroluminescence display device of claim 16, wherein the QB2 node control circuit includes:

a first transistor controlled by the Q node and connected to the QB1 node and a QB3 node;

a second transistor controlled by the low voltage and connected to the QB3 node and the QB2 node; and a capacitor connected to the QB2 node and a line provided with a second output clock signal.

* * * * *